United States Patent [19]

Salinas et al.

[11] Patent Number: 4,789,595

[45] Date of Patent: Dec. 6, 1988

[54] PROCESS FOR SURFACE TREATING LAYERED LATTICE SILICATES AND RESULTANT PRODUCTS

[75] Inventors: Jorge E. Salinas; Weyman H. Dunaway; Camilla A. Rice, all of Sandersville, Ga.

[73] Assignee: E.C.C. America Inc., Atlanta, Ga.

[21] Appl. No.: 731,056

[22] Filed: May 6, 1985

Related U.S. Application Data

[63] Continuation-in-part of Ser. No. 493,358, May 10, 1983, abandoned.

[51] Int. Cl.$^4$ .................. B32B 5/16; C04B 33/04; C08K 3/34
[52] U.S. Cl. ................ 428/402; 524/445; 524/447; 524/582; 524/584; 264/82; 423/326; 423/328; 423/331; 501/144; 501/146; 501/148; 106/486 A
[58] Field of Search ............... 524/447, 445, 584, 582; 423/136, 326, 328, 331; 501/144, 146, 148; 428/404, 402; 264/82; 106/309, 288 B, 288 R

[56] References Cited

U.S. PATENT DOCUMENTS

| | | | |
|---|---|---|---|
| 2,951,087 | 8/1960 | Hauser | 502/80 X |
| 3,987,058 | 10/1976 | Saunders et al. | 548/532 |
| 4,082,833 | 4/1978 | Wyndham et al. | 423/341 X |
| 4,357,451 | 11/1982 | McDaniel | 526/106 |
| 4,559,368 | 12/1985 | Heinen | 524/447 X |

OTHER PUBLICATIONS

Solomon et al., Chem. of Pigments and Fillers, Wiley-Interscience (1983) pp. 44–45.
Schwartz et al., "Plastics Materials and Processes" Van Nostrand Reinhold Co. Inc., N.Y. (1982) p. 494.
"Concise Chem. and Tech. Dictionary" H. Bennett (ed.), Chemical Publishing Co., Inc. N.Y. p. 257 (1974).
H. Deuel and G. Huber "Organische Derivate von Tonmineralien Alkoxy-, Alkyl- und Arylderivate des Montmorillonites".
*Helvetica Chimica Acta* vol. XXXIV, Fasciculus VI (1951) No. 203, 1697–1701.
H. Deuel, G. Huber and Hs. H. Gunthard "Organische Derivate von Tonmineralien. Untersuchungen an Phenylmontmorilloniten" *Helvetica Chimica Acta* vol. XXXV, Fasciculus VI (1952).
R. M. Barrer and J. S. S. Reay, "The Sorption of Benzene and Water by a 'Phenyl' Montmorillonite" in Clay Mineralogy Bulletin, 3, 214–220 (1958).
M. Derewinski and St. Malinowski, "Physico-Chemical and Catalytic Properties of Alumina-Silica Gels Modified with Gaseous Chlorine", Heterogeneous Catalysis, 2. Varna, 1979, 325–330.
I. F. Radzevenchuk, "Physicochemical Characteristics of Montmorillonite Catalyst Treated with Gaseous Hydrogen Chloride", Translated from Zhurnal Prikladnoi, Khimii, vol. 48, No. 7, 1601–1603, Jul. 1975.
J. Uytterhoeven and J. J. Fripiat, "International Geological Congress"-21st, Copenhagen, 1960, Part 24, pp. 80–87.

*Primary Examiner*—Joseph L. Schofer
*Assistant Examiner*—F. M. Teskin
*Attorney, Agent, or Firm*—Stefan J. Klauber

[57] ABSTRACT

A method for chlorinating the surface of a layered lattice silicate to produce a reactive chloride intermediate. The layered lattice silicate is reacted in substantially dry particulate form with a reactant system capable of forming bound chloride moieties at its surface, to form the said chloride thereof, the reaction being conducted at temperatures below that which would otherwise substantially alter the starting composition.

14 Claims, No Drawings

PROCESS FOR SURFACE TREATING LAYERED LATTICE SILICATES AND RESULTANT PRODUCTS

BACKGROUND OF THE INVENTION

This application is a continuation-in-part of copending application, Ser. No. 493,358, filed May 10, 1983, now abandoned.

This invention relates generally to siliceous minerals such as aluminosilicates and the like, and more specifically relates to a method for activating said materials to produce intermediates for enabling subsequent functionalization thereof.

The invention relates yet more specifically to layered silicates of the type which can be represented by the general formula $E_iM_xSi_yO_n(OH)_m$ where M is Al, Mg, or Fe, x=2 to 6; y=2 to 8, n=2 to 20, m=0 to 8, and $E_i$ is one or more exchangeable ions (K, Na, Mg, Ca, Ba, Fe, Li, etc.). These layered silicates will hereinafter in this specification be referred to as "layered lattice silicates."

In the instance of layered lattice silicates such as kaolins, it has long been recognized that products having new properties and uses could be formulated by combining these aluminosilicates with organic materials. However, useful progress in this direction has tended to be limited by the lack of available covalent bonding at the mineral/organic interface. In the past this difficulty has been partially overcome by surface modification of the kaolinite through coupling of organosilane compounds, and subsequent reaction between dependant silanes and organics.

It has long been known to treat silicates, siliceous minerals and the like, with halides, specifically including gaseous chlorine, for the purpose of producing chlorides for various industrial and other applications. Thus, for example, numerous processes have been utilized for recovering aluminum from clays, which involve a chlorination step, and which are conducted at very high temperatures. These processes generally produce aluminum chloride, which is further reacted to ultimately produce the desired aluminum.

In other instances, high temperature reactions of silicates or siliceous materials or minerals with chlorine have been utilized for the production of hydroxide-free silica for optical glasses.

Additional prior art bearing upon the present invention include the following:

In Moore et al, U.S. Pat. No. 3,236,606, hot chlorine containing gaseous compounds are utilized in the bleaching of clay in a reactor in which fuel and air is present, and temperatures of the order of 600° to 1200° C.

British Patent Specification No. 894,383 teaches subjecting a kaolin clay to shock heating and thereafter to bleaching of same by treatment with chlorine gas at 700° to 900° C.

Nordberg, U.S. Pat. No. 2,141,444, discloses the use of carbon and chlorine in the course of removing iron from high alumina materials, including kaolin, kyanite, bauxite, diaspore, and the like, by heating the materials in the presence of the said components at temperatures of 900° to 1150° C.

Hall, U.S. Pat. No. 1,405,115, teaches the manufacture of aluminum chloride by contacting alumina, sulphur and chlorine at temperatures sufficient to yield the aluminum chloride and sulphur dioxide.

Hall, U.S. Pat. No. 1,422,568, teaches a process for manufacturing aluminum chloride which consists in maintaining an atmosphere of chlorine and sulphur vapors in a heated chamber and blowing a powdered aluminum compound thereinto.

Toth, U.S. Pat. No. 3,615,359, teaches a process for producing aluminum involving conversion of alumina under reducing conditions in the presence of carbon with manganese chloride to form aluminum trichloride and manganese, the reaction taking place in a first reaction zone the temperature of which is about 190° C. at the inlet and 1400° C. at the outlet of the zone, and then reacting the latter at a temperature of up to about 1400° C., to reduce the aluminum trichloride to aluminum, by reacting the manganese with the said aluminum trichloride.

Willhoft, U.S. Pat. No. 4,073,872, discloses a process for recovering aluminum values from aluminum containing minerals such as bauxite and aluminosilicates, including kaolinite and the like. The aluminum containing mineral, together with carbon, is chlorinated to recover aluminum chloride. The process involves heating an intimate mixture of an aluminum containing mineral and a solid carbonizable organic material, so as to carbonize the organic material, and chlorinating the solid residue from the carbonization step. The temperature of reaction may be up to 1500° C., but is preferably slightly lower than the carbonization temperature, for example, in the range of 500° C. to 800° C.

Wyndham et al, U.S. Pat. No. 4,082,233, describes a method for carbo-chlorinating clay to produce aluminum chloride and silicon chloride. The clay is initially calcined with a solid carbonaceous reductant to form a reaction mass. Carbo-chlorination, in the presence of a sulphur-containing member, is conducted at temperatures within the range of from about 400° C. to about 1000° C.

Wyndham et al, U.S. Pat. No. 4,083,927, relates to further improvements for carbo-chlorination of clays which have previously been calcined. The reaction mixture during carbochlorination is in the temperature range of 600° C. to 950° C., using dry chlorine to which is added about 0.3% to 2.5% by volume of boron chloride.

Martin et al, U.S. Pat. No. 4,096,234, discloses the production of aluminum chloride from clay by chlorinating the clay through contact with a mixture consisting of a chlorinating agent, a reducing agent, an alkaline metal compound catalyst and silicon chloride. The chlorination process is carried out in a fluidized bed at a temperature of 550° C. to 650° C.

Wyndham et al, U.S. Pat. No. 4,139,602, relates to the preferential chlorination of alumina over silica in kaolinitic ores to produce aluminum chloride. The process utilizes carbo-chlorination; the kaolin clay is initially dried, comminuted, and calcined in the temperature ranging from 500° C. to 1000° C. The carbo-chlorination is effected in the temperature range of from 600° C. to 1000° C.

Martin, U.S. Pat. No. 4,213,943, discloses a process for producing aluminum chloride from clay containing aluminum oxide and silicon oxide, by a 2-step chlorination process. Chlorination is effected at 550° C. to 650° C.

Dell, U.S. Pat. No. 4,244,935, discloses a method for chlorinating particles of a substance containing metal and oxygen, utilizing a coking step carried out in a temperature range of 450° to 650° C., followed by a heating step carried out between 700° to 1100° C.

Reynolds et al, U.S. Pat. No. 4,288,414, discloses a process for recovering aluminum from clays associated with coal or bauxite containing iron, siliceous material and titanium, comprising chlorinating the material at temperatures of from about 650° C. to 900° C., in an oxidizing atmosphere in the presence of added oxygen; and then chlorinating the residue from the said step with chlorine at a temperature of from about 600° C. to 850° C., in a reducing atmosphere of carbon monoxide.

Dunn, U.S. Pat. No. 4,355,007, discloses a two stage process for chlorinating aluminum value-containing materials such as bauxite, clay, etc. The material is dehydrated, and then chlorinated in the presence of chlorine and carbon at a temperature of below about 1200° K. (temperature of about 1100° K. is typical); oxygen is introduced, and thereafter the non-gaseous product is chlorinated in the presence of chlorine and carbon at a temperature above about 1300° K.

U.S. Pat. Nos. 4,355,008 and 4,363,789, each to Dunn Jr. are similar to Dunn Jr. U.S. Pat. No. 4,355,007, to the extent that chlorination is involved in the course of producing aluminum from a material containing alumina values via chlorination.

In Saunders et al, U.S. Pat. No. 3,987,058, a process is disclosed for preparing sulfobenzylsilica by treating silica with thionyl chloride, reacting the silica chloride with benzyllithium and sulfonating the resulting bound benzylsilica with chlorosulfonic acid to obtain sulfobenzylsilica in which the organic moiety is bound to the silica through a carbon-silicon bond.

In McDaniel, U.S. Pat. No. 4,357,451, silica having an enhanced level of dehydration is produced by a three step process comprising (1) chlorination, (2) dechlorination, and (3) oxidation. The resulting composition is particularly suitable as a support for chromium-containing olefin polymerization catalysts.

In Papalos U.S. Pat. No. 3,227,675, kaolins are described, the surfaces of which are modified with organofunctional silanes. A typical such agent e.g. is a methacryloxypropyltrimethoxy silane. The kaolins so modified are advantageously used as fillers for natural and synthetic rubbers and the like. It is also pointed out in this patent that such modified products can serve as intermediates for synthesis of new pigments, which are useful as fillers for polymers, elastomers and resins. This result obtains because the silanes used to modify the kaolins are di- or polyfunctional, and only one functional group, the silane, is attached to the clay, leaving the remaining reactive groups to react further.

Additional references of this type include Iannicelli U.S. Pat. No. 3,290,165, and Iannicelli U.S. Pat. No. 3,567,680.

However, the modification of aluminosilicates such as kaolins by the use of organosilanes, is an expensive process, because the cost of the organosilane itself is very high.

In accordance with the foregoing, it may be regarded as an object of the present invention, to provide a process which enables the formation of the chlorides of layered lattice silicates, thereby providing new intermediates, which are eminently capable of subsequent functionalization with organic groups and the like.

It is a further object of the invention to provide a process as aforementioned, which process may be practiced on a very wide variety of layered lattice silicates, including numerous types of clays, such as those of the kaolin group, smectite group, illite group, etc.

It is a further object of the present invention to provide new surface modified layer lattice silicates, which can be utilized as fillers for polymer systems, or for papers or the like.

SUMMARY OF THE INVENTION

Now in accordance with the present invention, the foregoing objects, and others as will become apparent in the course of the ensuing specification, are achieved in a method for chlorinating layered lattice silicates to produce active intermediates, comprising reacting the said silicate in substantially dry particulate form, with a reactant system capable of activating the surface thereof by forming bound chloride moieties at said surface. By "activating the surface" is meant that the surface in consequence of the process, has become susceptible to the surface bonding of organic moieties.

The said reaction is conducted at temperatures below about 300° C., and preferably in the range of from room temperature (about 25° C.) to 150° C. These temperatures are such as to be below that at which volatilization or dehydroxylation of the starting material will occur. Thus the layered lattice silicate starting materials are not otherwise substantially chemically or physically altered in the course of the process, so as to lose their basic properties.

The gaseous treating composition preferably comprises a mixture of carbon monoxide and gaseous chlorine, in a 1:1 mole ratio. Gaseous chlorine may also be used in the invention. The gaseous reactants can be diluted with an inert gas such as argon or nitrogen.

The said reaction may be conducted in a fluidized bed reactor with the gaseous components passing upwardly through a suitable diffuser plate, and into a fluidized bed of the particulate material being treated. The reaction may also be conducted in a rotary dryer, or similar apparatus, which is constructed of suitable material to withstand the relatively corrosive atmosphere present as a result of the aforementioned reactants. Typical reaction times are from about 5 seconds to 15 minutes, depending upon concentration of the reactants, and upon the temperature and pressure. Longer reaction times can also be utilized depending upon the final application of the product.

Various layered lattice silicates may be treated by the method of the invention. Thus, for example, clays of the halloysite, illite, kaolinite, smectite and palygorskite groups, and various other clays, can be readily treated by the present invention.

Where the aforementioned combination of chlorine and carbon monoxide, or gaseous chlorine are used to effect chlorination pursuant to the invention, the chlorinating agent can be considered to be free radical chlorine which is transiently formed in the course of the reaction. Other chlorinating agents may also be utilized in the invention.

The intermediates prepared by use of the present process are highly reactive, and will decompose by hydrolysis if substantial moisture is present. For such reason, once the said intermediates are prepared, and until they are used, they must be maintained in a substantially dry state.

The functionalization of the chlorinated intermediates can be achieved by various methods, such as contacting same under suitable reaction conditions with compounds having active organic groups. The reaction can be carried out with the functionalizing reactant in the gaseous phase, in the liquid phase, or in a system containing inert organic solvents. These reactions can be effected by various techniques; for example, in many instances by simple mixing or contacting of the intermediates with the reactants.

A large variety of groups can be used to functionalize the intermediates; for example alkenes, allyls, mercaptans, amines, etc.

DESCRIPTION OF PREFERRED EMBODIMENTS

The invention will now be illustrated by a series of Examples, which, however, are to be considered as merely exemplary of practice of the invention, and not as delimitive thereof.

EXAMPLE I

Preparation of An Intermediate From a Kaolin Clay

In this Example, the starting material was an air classified kaolin, having approximately 60% by weight of the particles thereof, less than 2 micrometers equivalent spherical diameter (E.S.D.). A 400 gram sample of this material was initially dried for 1.5 hours in an oven at temperatures of about 150° C. to produce a substantially dry material.

The said sample was placed in a laboratory fluidized bed reactor and the system was equilibrated at 120° C., at which time a mixture of $CO/Cl_2$ (2.9:1 molar ratio), at 120° C., was passed through the fluidized bed. The gas mixture was flowed at the rate of about 0.7 standard cubic feet per minute (SCFM), and served to sustain the fluidized bed. The chlorinated kaolin was cooled to room temperature in a stream of dry nitrogen gas. The product was removed from the reactor and stored in a dry atmosphere. An elemental analysis of this product showed an increase of 0.24% chlorine, which approximates 320 atoms of chlorine per one square nanometer. The chlorine was not removed from the kaolin when 5 grams of the treated kaolin was washed with 50 ml of dry acetone, but 90% could be removed when 5 grams was washed with 50 ml of distilled water. This establishes that the chlorine surface bond is easily hydrolyzable, and may indicate a partially ionic bound species.

EXAMPLE II

A 300 gram sample of a calcined kaolin (the Alphatex ® product of Anglo-American Clays Corporation of Atlanta, GA), was dried for 1½ hours at 150° C. It was placed in a laboratory fluidized bed reactor and the temperature of the system was equilibrated to 150° C. At this time, a mixture of $CO/Cl_2$ (1:1 molar ratio) was passed through the system at a flow rate of 0.70 standard cubic feet per minute for 5 minutes. The gas mixture was passed through a heat exchanger at 389° C. prior to passing through the fluidized bed reactor.

The sample was flushed with heated $N_2$ gas for three minutes. 1, 3-butadiene gas was then passed over the hot chlorine treated sample for 1 minute. The sample was again flushed with $N_2$ gas and cooled in an unheated stream of nitrogen. The sample was removed from the reactor and analyzed for carbon and chlorine content. The final product showed an increase in percentage chlorine from 21 parts per million to 0.25%. The carbon content due to 1, 3-butadiene showed an increase from 0.03% to 0.49%.

The surface modified calcined kaolin displayed hydrophobic character. When a 0.1 gram sample was slurried in $CCl_4$, a solution of $Br_2/CCl_4$ was decolorized by the kaolin, indicating the presence of active double bond carbon character on the clay surface.

The carbon was not removed from the surface modified calcined by repeated washings with distilled water.

EXAMPLE III

A 200 gram sample of a sodium bentonite was dried at 150° C. for 1.5 hours. It was placed in a laboratory fluidized bed reactor. The temperature of the system was equilibrated to 135° C. The sample was then exposed to $CO/Cl_2$ for 10 minutes as described in Example II.

The sample was cooled to 80° C. in a stream of dry nitrogen, at which time it was exposed to 1, 3-butadiene gas for one minute. The sample was then cooled to room temperature and removed from the reactor.

The surface modified bentonite was analyzed for chlorine and carbon. It showed an increase in chlorine of 0.58% and carbon of 0.48%. This organic was not removed by vacuum evacuation for 24 hours at $10^{-3}$ tor, nor by washing the sample repeatedly with water.

EXAMPLE IV

A 400 gram sample of an air classified kaolin (90% by weight less than 2 micrometers E.S.D.) was dried at 150° C. for 1.5 hours. It was immediately transferred to a laboratory fluidized bed reactor, the temperature equilibrated to 135° C., and the sample chlorinated for 2.5 minutes as described in Example I. The temperature of the clay was 200° C. at the end of the reaction. The system was flushed with nitrogen for 5 minutes and then treated with 1, 3-butadiene gas as in Example II for 3 minutes (the clay temperature was approximately 195° C. when butadiene was exposed to the kaolin surface).

The resulting surface treated clay showed an increase in chlorine of 0.22% and in carbon of 1.19%.

This surface treated kaolin was used as a filler in a resin matrix binder. Specifically, it was added to polypropylene at the 30% filler level, and injection molded at 176° C. The physical properties of the unfilled and filled systems are given in Table I. It can be seen from this data that there is a substantial increase in flex modulus for the polypropylene system filled with the surface modified kaolin, with no drop in impact strength, tensile strength and/or flex yield.

TABLE I

Physical Properties of Filled and Unfilled Injection Molded Polypropylene

| Sample | Flex Modulus MPa* | Flex Yield MPa* | Tensile Strength MPa* | Impact Strength −20° C./20° C. |
|---|---|---|---|---|
| Unfilled | 952 | 45.2 | 42.7 | 0.092/0.297 |
| Filled | 1322 | 52.3 | 41.6 | 0.112/0.279 |

*Mega Pascals
Foot-lbs/inch (ASTM Procedure D 256A)

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A method for modifying the surface of a layered lattice silicate comprising:

reacting said layered lattice silicate in substantially dry particulate form with a reactant system capable of forming bound chloride moieties at said silicate surface, to form the chloride thereof, said reactant system comprising a gas containing $Cl_2$, said reaction being conducted at temperatures below about 300° C.; and reacting the chloride product with a reactive organic compound comprising a functional group.

2. A process in accordance with claim 1 wherein said reaction is conducted at temperatures in the range of from about 25° to 150° C.

3. A method in accordance claim 1, wherein said reactant system comprises a mixture of CO and $Cl_2$.

4. A method in accordance with claim 3, wherein said mixture further includes a dry inert gas carrier.

5. A method in accordance claim 4, wherein said inert gas carrier comprises dry nitrogen.

6. A method in accordance with claim 1, wherein said reaction is conducted in apparatus for contacting particulate solids with gases.

7. A method in accordance with claim 1, wherein said reaction is conducted in a fluidized bed reactor.

8. A method in accordance with claim 1, wherein said reaction is conducted in a rotary drier.

9. A method in accordance with claim 1, wherein said layered lattice silicate comprises a clay mineral.

10. A method in accordance with claim 1, wherein said layered lattice silicate comprises a kaolin.

11. A method in accordance with claim 1, wherein said layered lattice silicate comprises a calcined kaolin.

12. A method for modifying the surface of an aluminosilicate clay which comprises:

reacting a kaolin group or smectite group clay in substantially dry particulate form with a gas comprising $Cl_2$ to form bound chloride moieties at said surface, the reaction being conducted at temperatures below about 300° C. for a time of about 5 seconds to about 15 minutes and substantially without decomposition of said clay;

and reacting the chlorinated product so obtained with a reactive organic compound comprising an olefinic group.

13. A method in accordance with claim 12 in which said organic compound is butadiene.

14. A composition of matter for use as a filler in paper, rubber, resin and plastics which comprises: a particulate kaolin, the surface of which has been activated by forming bound chlorides at said surface, and the resultant surface-activated product reacted with an organic compound comprising an olefinic group.

* * * * *